US007849772B2

(12) United States Patent
Monteil

(10) Patent No.: US 7,849,772 B2
(45) Date of Patent: Dec. 14, 2010

(54) ROTARY CUTTING APPARATUS COMPRISING A CUTTER DRUM AND AN ANVIL DRUM

(75) Inventor: Lilian Monteil, Saint Martin d'Août (FR)

(73) Assignee: Sandvik Intellectual Property AB, Sandviken (SE)

( * ) Notice: Subject to any disclaimer, the term of this patent is extended or adjusted under 35 U.S.C. 154(b) by 394 days.

(21) Appl. No.: 11/398,754

(22) Filed: Apr. 6, 2006

(65) Prior Publication Data

US 2006/0248999 A1 Nov. 9, 2006

(30) Foreign Application Priority Data

Apr. 7, 2005 (SE) .................................... 0500779
Apr. 7, 2005 (SE) .................................... 0500780
Feb. 14, 2006 (SE) .................................... 0600323

(51) Int. Cl.

*B23D 25/12* (2006.01)
*B26D 5/08* (2006.01)
*B26D 1/56* (2006.01)
*B21B 31/08* (2006.01)
*B65H 20/00* (2006.01)
*B29C 65/00* (2006.01)
*B32B 37/00* (2006.01)

(52) U.S. Cl. ............................ 83/344; 83/564; 72/238; 226/154; 156/552

(58) Field of Classification Search ................... 83/344, 83/346, 348, 658, 659, 506, 566, 343, 564; 72/238, 239; 156/552, 357, 516; 225/46, 225/56; 399/401; 226/154, 155, 176, 177, 226/181, 186, 187

See application file for complete search history.

(56) References Cited

U.S. PATENT DOCUMENTS 3,908,426 A * 9/1975 Aramaki ...................... 72/238
3,971,279 A * 7/1976 Wright ...................... 83/425.4
4,000,762 A * 1/1977 Mizuno ...................... 139/452
4,119,256 A * 10/1978 Vogtmann et al. ........... 226/177
4,188,843 A * 2/1980 Dickey ........................ 83/304
4,759,485 A * 7/1988 Braun et al. ................ 226/176
4,770,078 A 9/1988 Gautier ........................ 83/344
4,840,300 A * 6/1989 Tsuji .......................... 226/187
4,882,004 A * 11/1989 Watson ....................... 156/381
5,072,872 A * 12/1991 Casset et al. ................ 226/176
5,174,182 A * 12/1992 Rosenthal et al. .............. 83/63
5,778,782 A * 7/1998 Behringer et al. ........... 101/226
5,906,569 A * 5/1999 Ratzel ........................ 493/363

(Continued)

FOREIGN PATENT DOCUMENTS

DE 4441278 3/1996
JP 2001-300888 10/2001

*Primary Examiner*—Ghassem Alie
*Assistant Examiner*—Bharat C Patel
(74) *Attorney, Agent, or Firm*—Drinker Biddle & Reath LLP

(57) ABSTRACT

A rotary cutting apparatus includes a cutter drum having at least one cutting member and an anvil drum having a rotary axis, arranged in a cutting relationship to one another, and a pressure actuating device for subjecting pressure on said cutting member in relation to the anvil drum. The pressure actuating device includes a pair of levers rotatable about at least one hinge having a horizontal axis. The horizontal axis is parallel to but non-concentric with the rotary axis. In addition, a frame supports the cutter drum and the anvil drum in a rotatable relationship. The pair of levers are releasably connected to the bearing housing, respectively, in such a way that the anvil drum is allowed to be removed from the frame.

18 Claims, 16 Drawing Sheets

U.S. PATENT DOCUMENTS

| | | | | |
|---|---|---|---|---|
| 5,915,644 | A * | 6/1999 | Prittie | 242/525.4 |
| 6,244,148 | B1 | 6/2001 | Vees | 83/348 |
| 7,021,356 | B2 * | 4/2006 | Kelders et al. | 156/523 |
| 7,175,578 | B2 * | 2/2007 | Elkis et al. | 483/16 |
| 7,299,729 | B2 * | 11/2007 | Cox | 83/343 |
| 2002/0141804 | A1 * | 10/2002 | Ono et al. | 400/120.01 |
| 2003/0139274 | A1 | 7/2003 | Cipolli | |
| 2005/0084306 | A1 * | 4/2005 | Nakaoka et al. | 399/401 |

* cited by examiner

ROTARY CUTTING APPARATUS COMPRISING A CUTTER DRUM AND AN ANVIL DRUM

FIELD OF THE INVENTION

The present invention generally relates to a rotary cutting apparatus. More particularly, the present invention pertains to a rotary cutting apparatus comprising a cutter drum having at least one cutting member and an anvil drum having a rotary axis, arranged in a cutting relationship to one another, and a pressure actuating device for subjecting pressure on the cutting member in relation to the anvil drum.

BACKGROUND

U.S. Pat. No. 6,244,148 describes a rotary cutting apparatus including a cutter drum and an anvil drum, where a pressure actuating device applies pressure to the cutting member in relation to the anvil drum. The apparatus described therein has significant drawbacks in that it is costly and cumbersome to disassemble it for maintenance, e.g. for re-grinding the anvil drum. Another rotary cutting apparatus is described in U.S. Pat. No. 4,770,078, which suffers from the same drawbacks.

Japanese Unexamined Patent Publication No. 2001-300888 discloses a rotary cutting apparatus, which comprises a lever for subjecting pressure on the cutting member, but is cumbersome to disassemble, since the lever is directly connected to the roller bearing. Such connection generally requires shrink fit, or a least press fit, causing a very cumbersome disassembly for maintenance.

Accordingly, there is a need in the art to reduce the time and cost for performing maintenance of a rotary cutting apparatus.

SUMMARY

A first aspect of the invention pertains to a rotary cutting apparatus comprising a cutter drum having at least one cutting member. An anvil drum has a rotary axis and is arranged in a cutting relationship to the cutter drum. A pressure actuating device subjects pressure on the cutting member in relation to the anvil drum. The pressure actuating device comprises a pair of levers rotatable about at least one hinge having a horizontal axis. The horizontal axis is parallel to but non-concentric with the rotary axis, wherein a bearing housing is arranged on each axial side of the anvil drum. A frame supports the cutter drum and the anvil drum in a rotatable relationship, wherein the pair of levers are releasably connected to the bearing housing, respectively, in such a way that the anvil drum is allowed to be removed from the frame.

BRIEF DESCRIPTION OF THE DRAWING FIGURES

The accompanying drawings provide visual representations which will be used to more fully describe the representative embodiments disclosed herein and can be used by those skilled in the art to better understand them and their inherent advantages. In these drawings, like reference numerals identify corresponding elements.

DETAILED DESCRIPTION

Figure 1A:
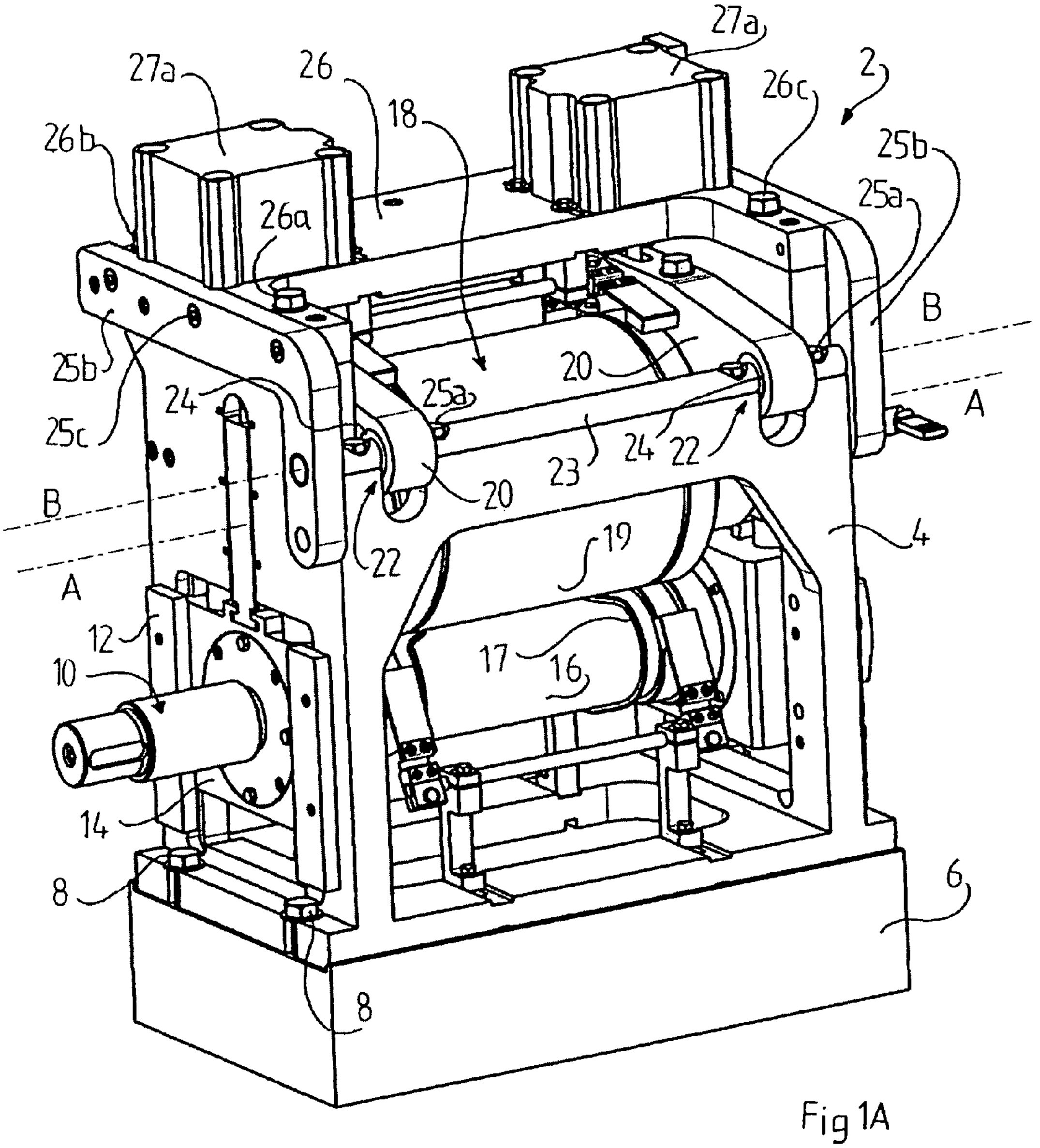
FIG. 1A is a front view of a first variant of a rotary cutting apparatus having a frame.

FIG. 1A shows a rotary cutting apparatus 2 comprising a frame 4 attached to a base 6 by means of screws 8. A rotary cutting device 10 is removably attached to the frame 4 by means of plates 12 securing cutter bearing housing 14 on either sides of a cutter drum 16 provided with at least one knife member 17.

An anvil 18 with an anvil drum 19 and having a substantially horizontal axis A-A (see also FIG. 4*a*) is arranged vertically above the rotary cutting device 10 and includes an axially peripheral surface 43 of the anvil drum 19.

A pair of levers 20 are rotatably arranged about a hinge 22, comprising an axle 23 journalled in bearings 24, the axle 23 having a substantially horizontal axis B-B and being attached to the frame 4 by means of screws 25*a* and a pair of L-shaped bars 25*b*, connected to a lid 26 of the frame by means of screws 25*c*. The lid 26 is connected to the frame 4 by means of four screws 26*a*, 26*b*, 26*c*, 26*d* (the latter being hidden).

The levers 20 are arranged on either sides of a vertical plane through the axis B-B of the anvil 18. Two pneumatic cylinders 27*a* are arranged substantially parallel to the hinge axis B-B and the rotational axis A-A and opposite to a vertical plane through the axis A-A. The cylinders 27*a* are adapted to co-operate with the levers 20, respectively, for turning them about the hinge 22. As can be seen in the Figures, the horizontal axis (B-B) of the levers is arranged, seen in a vertical plane, above the rotary axis (A-A).

Figure 1B:
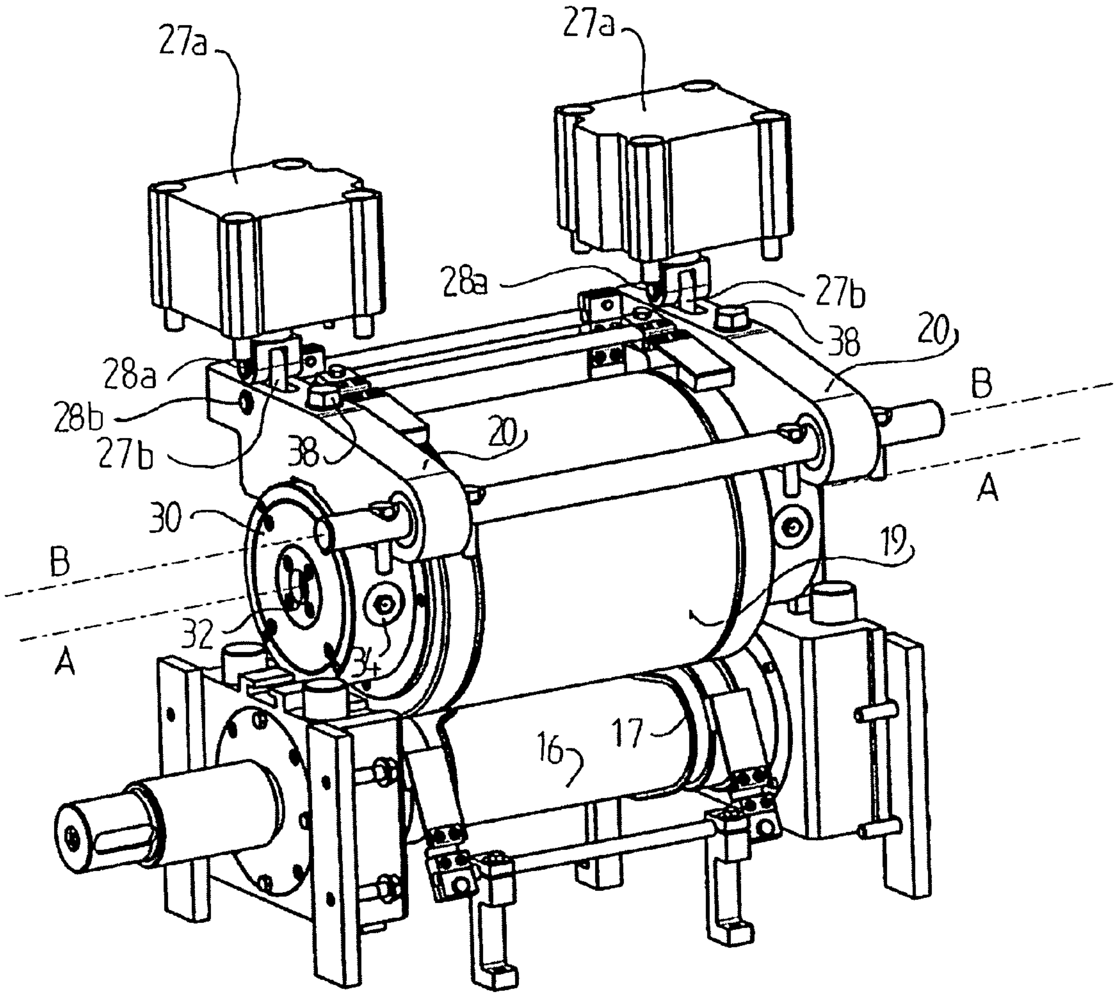
FIG. 1B is a magnification in-part of FIG. 1A, parts of the frame being omitted.

FIG. 1B shows furthermore that the inter-connection of the jacks 27*a* with the levers 20 comprises a link 27*b* provided with double hinges 28*a*, 28*b*, respectively. The pneumatic cylinders 27*a* are adapted to apply a substantially vertical force on the levers 20, respectively, via the links 27*b*, resulting in a rotation about the hinges 22 such that the levers 20 will perform an arc-shaped movement.

The anvil 18 is provided with a bearing housing 30, on either sides of the anvil drum 19. Each bearing housing 30 is provided with a coaxial opening 32 for allowing access to the interior of the bearing housing 30, and with a screw 34 covering an oil filling hole 35 (see FIG. 4*b*). The bearing housing 30 is also provided with a radially directed threaded opening 36 (see FIG. 4*a*) for receiving a screw 38 in order to attach the bearing housing 30 to the lever 20.

During operation, the cylinders 27*a* will press the anvil drum 19 towards and against the knife member 17 of the cutter drum 16. Even though the levers 20 perform an arc shaped movement, it is so small that the movement of the anvil drum 19 towards and against the cutter drum 16 will be substantially vertical.

Figure 1C:
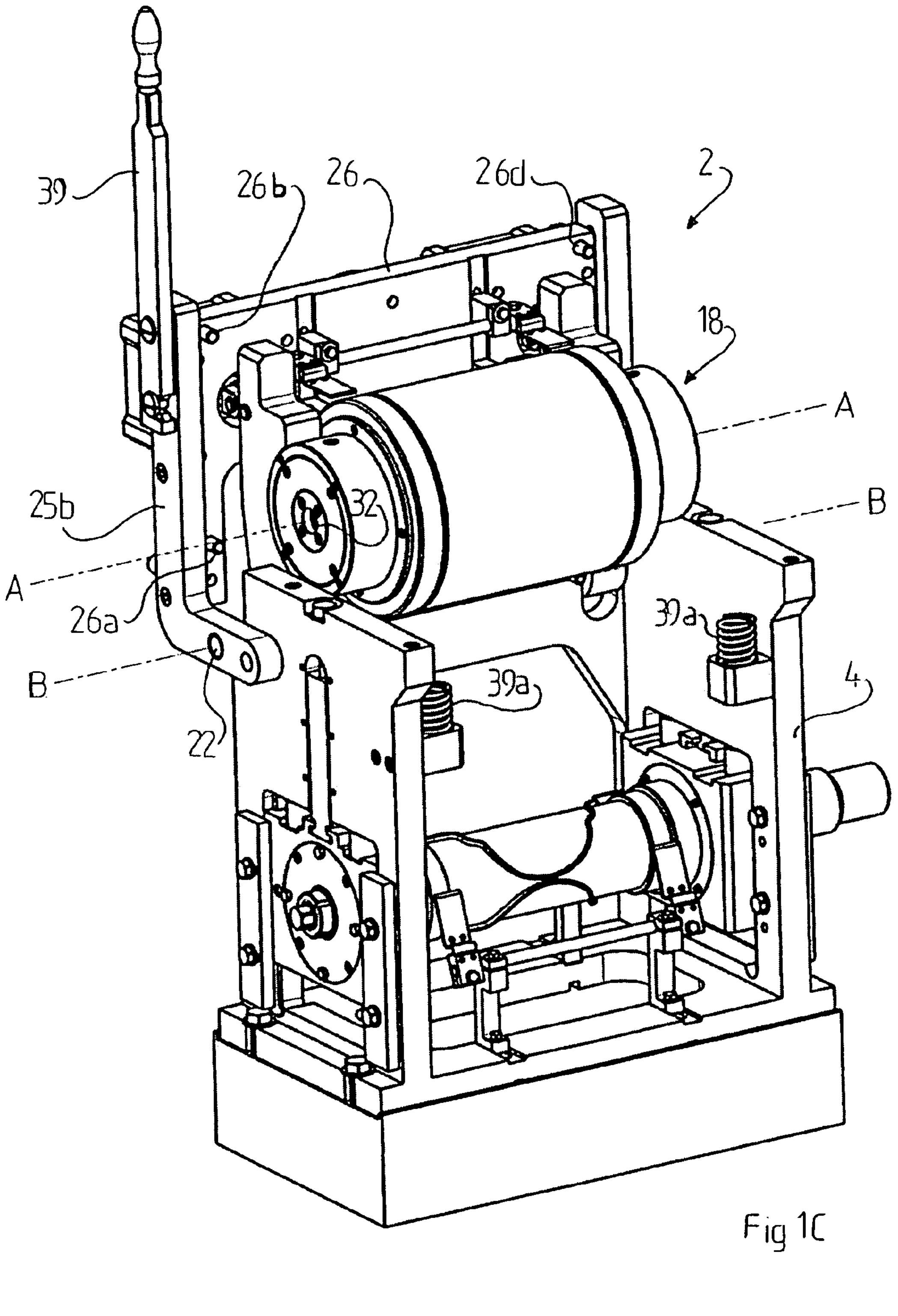
FIG. 1C is a rear view of the frame shown in FIG. 1A, however in an open state.

FIG. 1C shows the rotary cutting apparatus 2 in an open state for allowing removal and maintenance of the anvil 18. This has been performed by attaching a detachable handle 39 to one of the L-shaped bars 25*b*, loosening the screws 26*a*, 26*b*, 26*c* and 26*d* and turning the lid 26 about the hinge 22.

In the position shown, a lifting device (not shown) can be attached to the openings 32 of the anvil 18 for lifting it away from the frame 4. After attachment of the lifting device to the anvil 18, the screws 38 (see FIG. 1B) are loosened such that the anvil 18 is released from the levers 20.

Pneumatic cylinders have generally the characteristics that in the beginning of the movement of the piston, the force is not easily controllable, since the generated force will not be linear with respect to the applied pneumatic pressure in the cylinder. In order to overcome this problem, springs 39*a* are arranged to act on the end of the lever opposite to that of the hinge 22. The springs 39*a* will also counter balance the weight of the anvil 18, such that a minimum pressure is required for the anvil drum 19 to come into contact with the cutter drum 16 during use. The springs 39*a* will also prevent the anvil from colliding with the cutter drum 16, hereby avoiding damages of the knife member 17 and/or the axially peripheral surface 43 of the anvil drum 19.

Figure 2A:
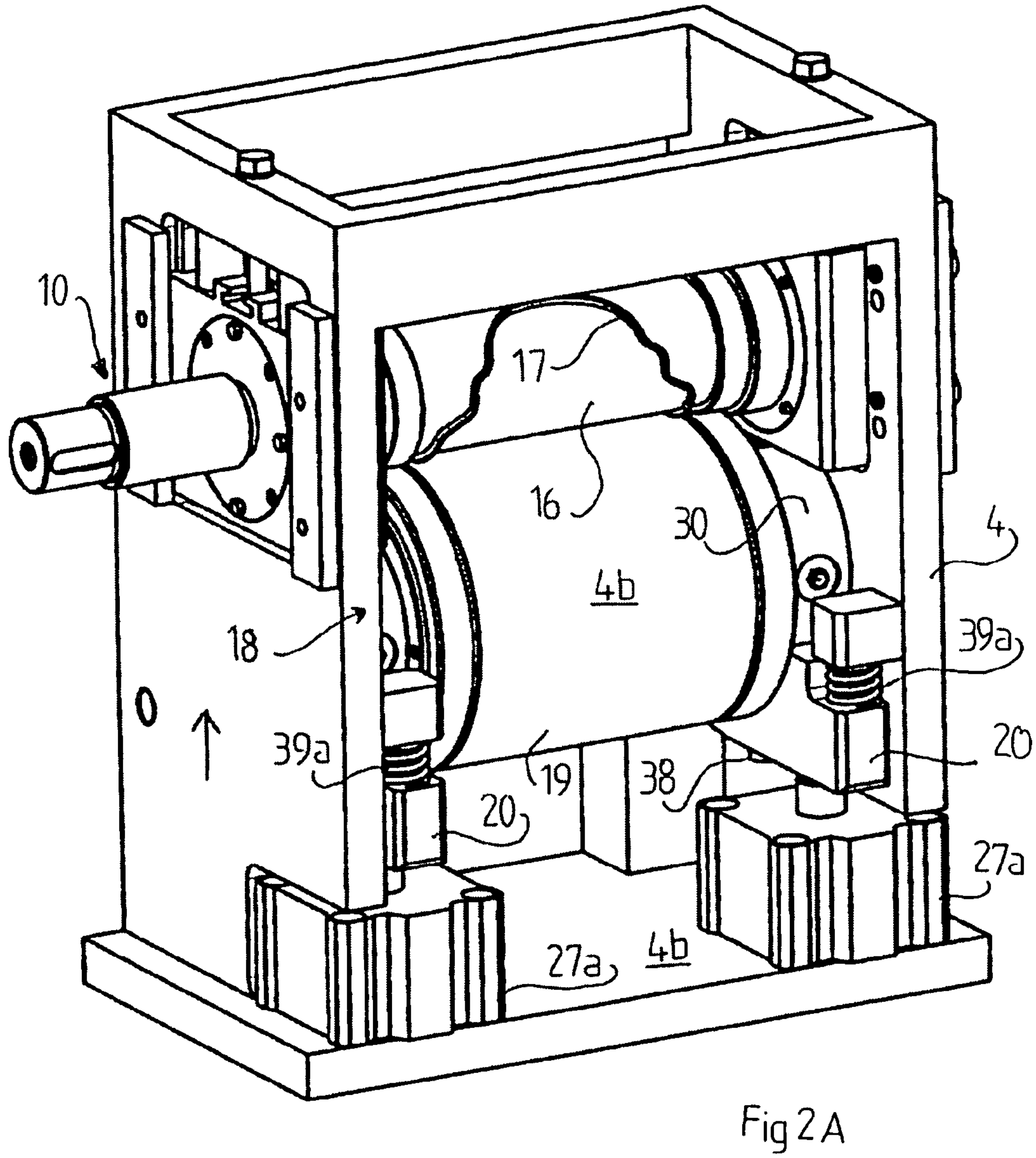
FIGS. 2A and 2B are front and rear perspective views of a second variant of a rotary cutting apparatus.
Figure 2B:
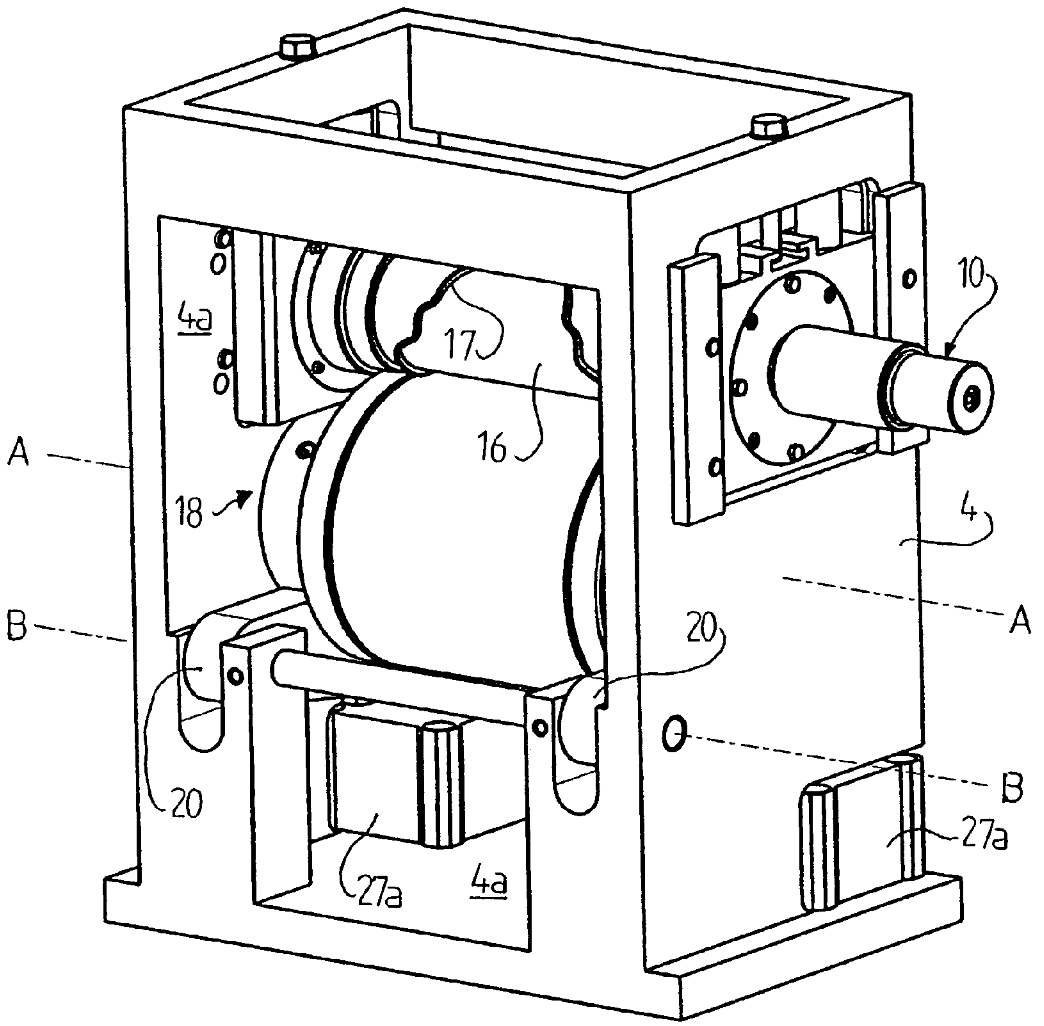

FIGS. 2A and 2B show in front and rear perspective views of a second variant, according to which the anvil 18 is arranged underneath the cutter drum 16. In this embodiment, the cylinders 27*a* and the levers 20 are arranged underneath the anvil 18. The cylinders 27*a* thus subject a force directed substantially vertically upwards (see arrow) to the anvil 18 towards and against the knife member 17 of the rotary cutting device 10.

Also in this case springs 39*a* are provided for the same purpose as mentioned above.

The frame 4 forms an opening 4*a*, 4*b* on each side of a vertical plane through the axis A-A of the anvil 18.

Furthermore, the horizontal axis (B-B) of the levers is arranged, seen in a vertical plane, below the rotary axis (A-A).

Figure 2C:
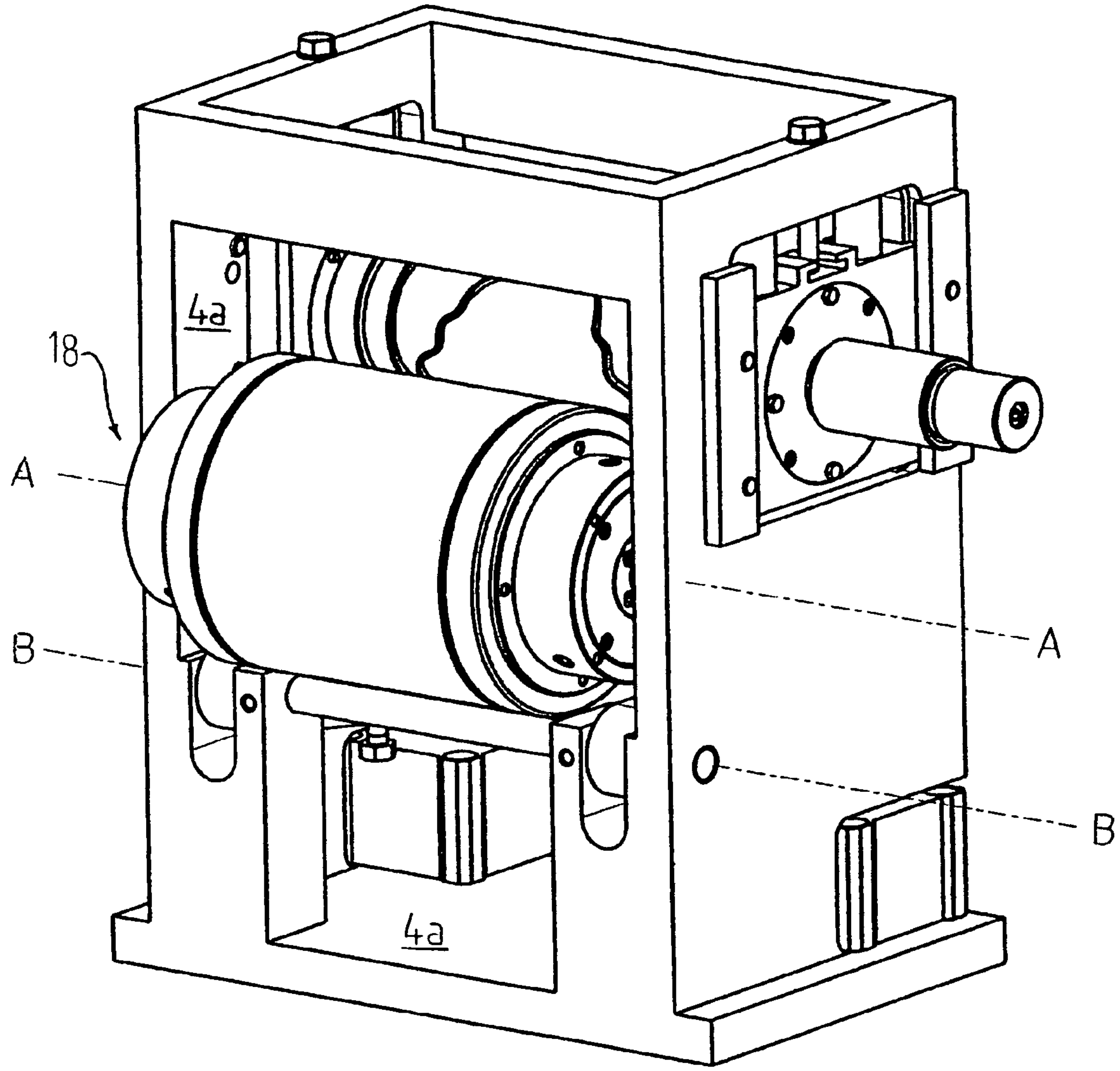
FIG. 2C illustrates an open state of the frame shown in FIGS. 2A and 2B.

As shown in FIG. 2C, the anvil 18 according to this variant is removed for service by placing a table or a wagon beneath the frame 4, unscrewing and removing the screws 38 for releasing the anvil 18 from the levers 20 and then moving the anvil 18 in a direction across the axis A-A through the frame opening 4*a* to the table or wagon. A lifting device now can be attached to the openings 32 of the anvil 18 for lifting it away for maintenance.

Figure 3A:
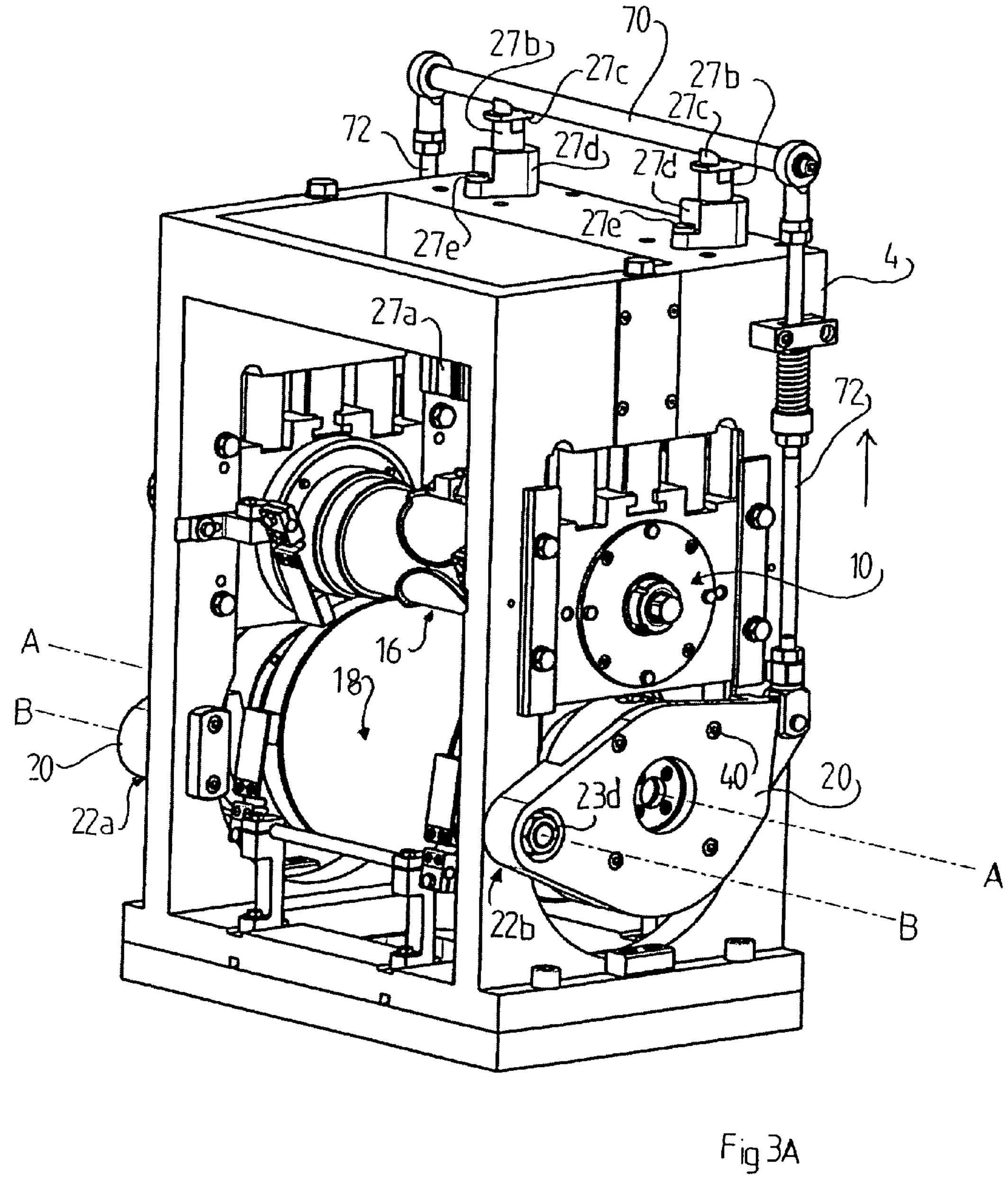
FIGS. 3A and 3C are front perspective views of a third variant of a rotary cutting apparatus.
Figure 3B:
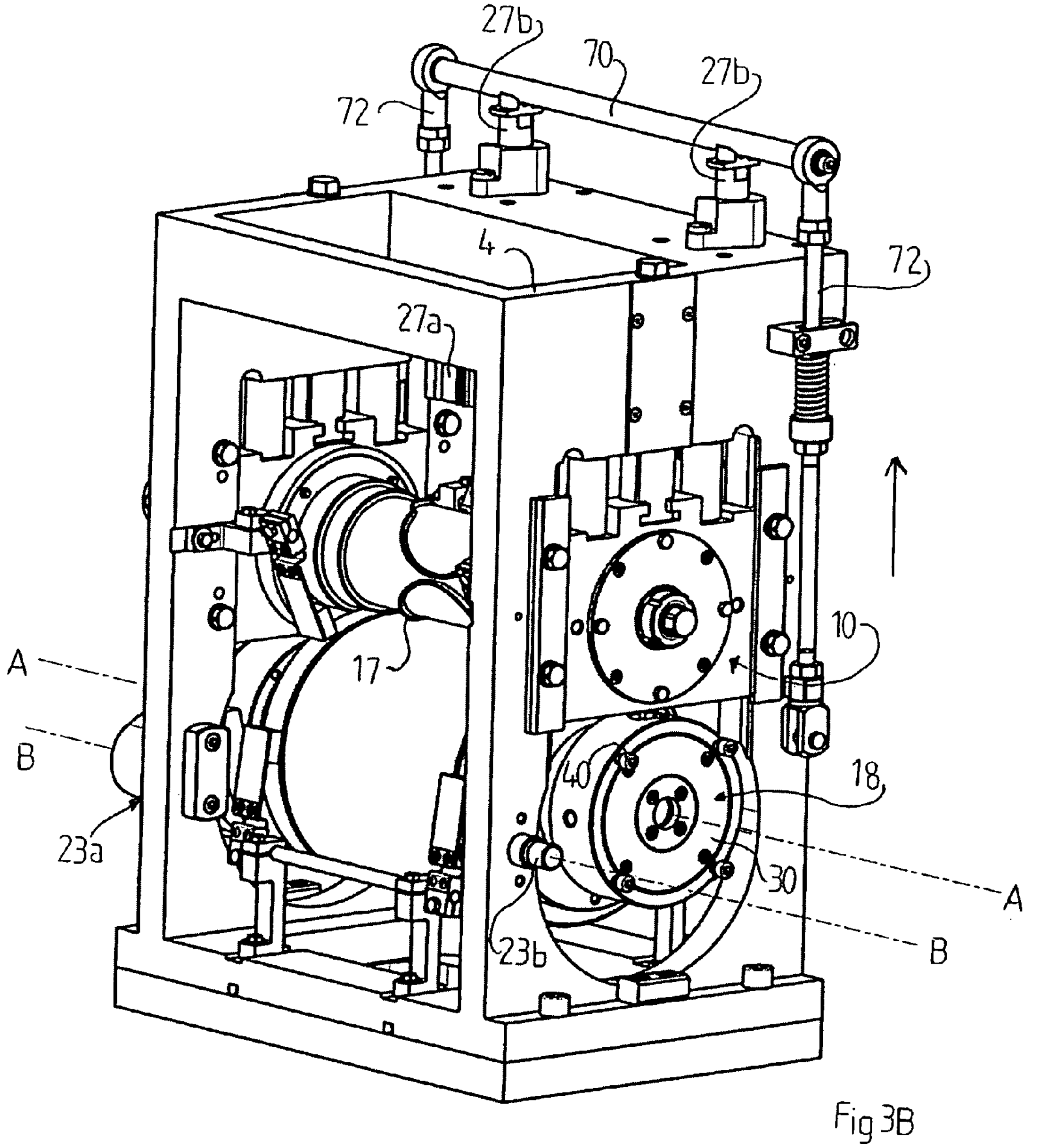
Figure 3C:
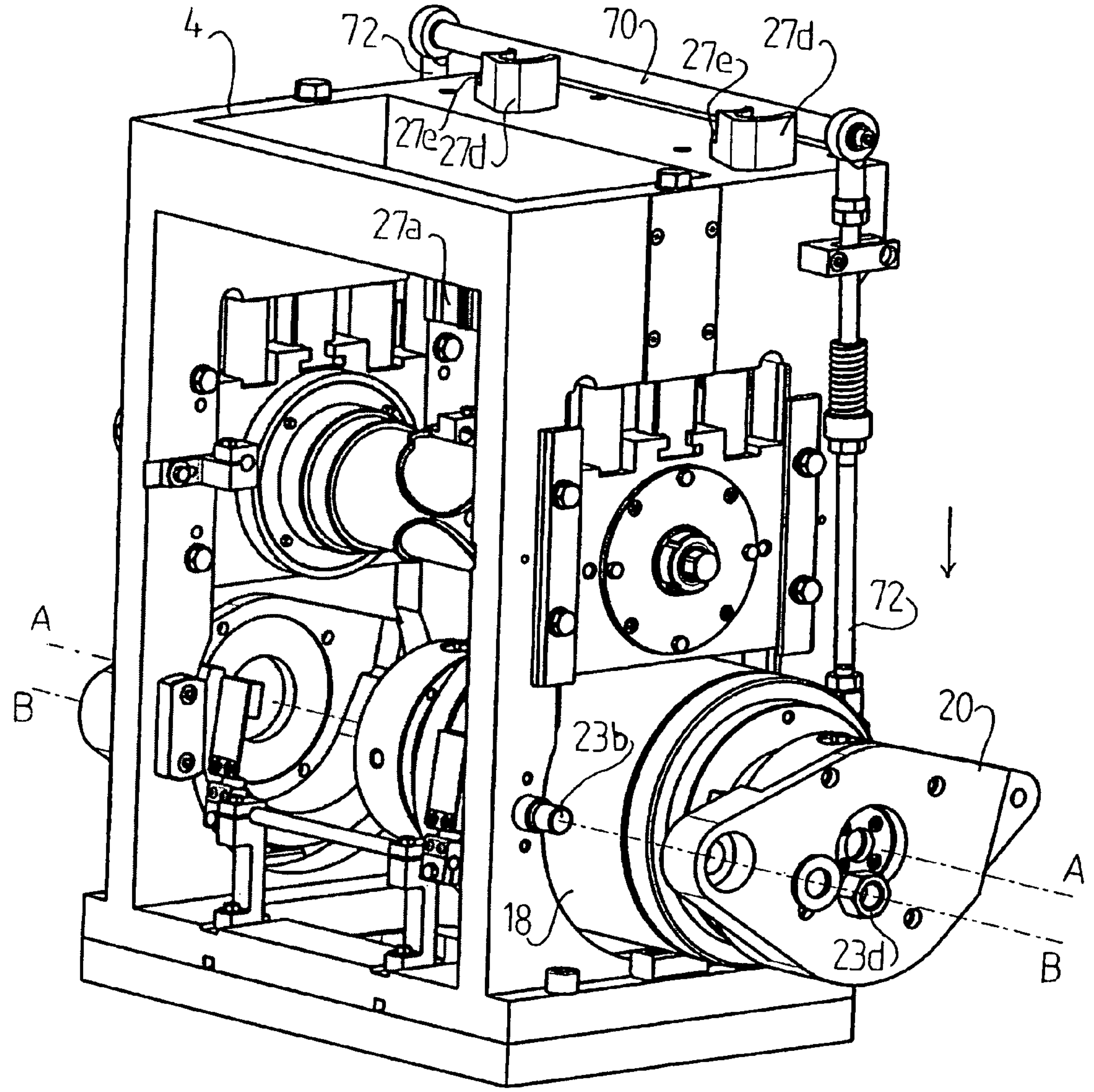

FIG. 3A to 3C show a third variant, according to which the anvil 18 and the levers 20 (omitted in FIG. 3B for better understanding) are arranged underneath the rotary cutting device 10, whereas the cylinders 27*a* are arranged above the anvil 18, in fact also above the cutting device 10, even though it would be possible to arrange the cylinders 27*a* at the same vertical level as the cutting device 10, i.e., beside it.

The piston rod 27*b* of the cylinders 27*a* are each provided with a holding member 27*c*, shaped for receiving a horizontal crossbar 70 at two separate horizontal positions. The crossbar is connected to a pair of vertical bars 72, each of which being connected to one of the levers 20. A pair of guiding members 27*d* for guiding constitute stop members for the piston rods 27*b*. The guiding members 27*d* are rotatably connected to the frame 4 by means of a hinge 27*e*.

When the cylinders are moved upwardly, the anvil 18 will be moved towards and against the knife member 17 of the rotary cutting device 10, i.e., the anvil 18 will be subjected to a pulling force, as opposed to the force according to the first and second variants, according to which the applied force is a pressing force.

In this variant, the levers 20 are arranged on separate hinges 22*a* (hidden), 22*b*, each being provided with an axle 23*a* (hidden), 23*b*, the levers 20 being secured thereto by means of a nut 23*c* (hidden), 23*d*, respectively. The axles 23*a*, 23*b* are aligned with one another in order to form a common rotational axis B-B. The bearing housings 30 are provided with axially directed openings for receiving screws 40 in order to attach the bearing housing 30 to the lever 20.

Furthermore, the horizontal axis (B-B) of the levers is arranged, seen in a vertical plane, at about the same level as the rotary axis.

In FIG. 3C is shown how the anvil 18 is allowed to be removed for service. To start, the guiding members 27*d* are turned about the hinge 27*e*, allowing the piston rods to be retracted to a position not visible in the figure, i.e., inside the frame 4. The crossbar 70 is released from the holding members 27*c*, allowing the vertical bars 70 to be moved downwards (see arrow), in turn causing the levers 20 to turn downwards about the axis B-B. Then the screws 40, the nut 23*d* and the corresponding lever 20 are released and removed. The anvil 18 is now allowed to be pulled out from the frame along axis A-A.

The springs 39*a* have the same purpose as those shown in FIGS. 1A-2C.

Figure 4A:
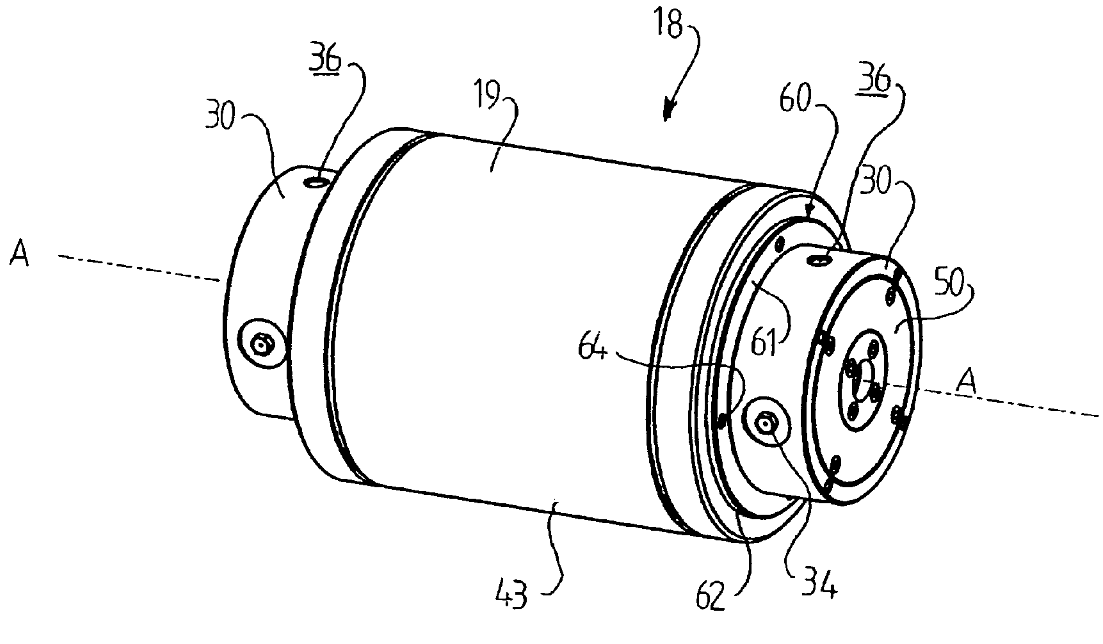
FIG. 4A illustrates the anvil shown in FIGS. 1A to 3B.
Figure 4B:
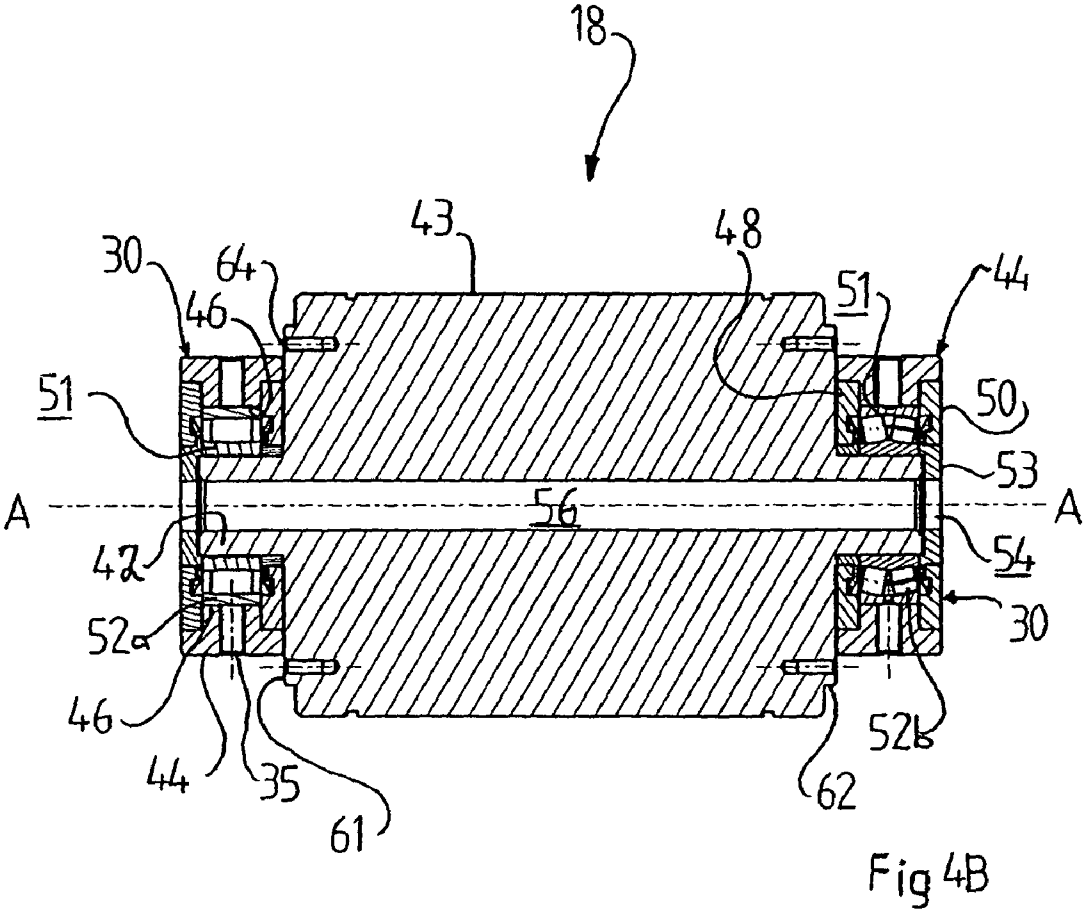
FIG. 4B is a cross-section of the anvil shown in FIG. 4A.

FIGS. 4A and 4B show the anvil 18 with its anvil drum 19 and bearing housings 30. In FIG. 4B, the anvil drum 19 has been shown as solid with integrated axle 42. The axially peripheral surface 43 of the anvil drum is centered coaxially with the axis A-A during its manufacture. The drum 19 may however instead be hollow, e.g. in the form of a sleeve, attached to the axle 42, i.e., constituting a separate part.

The bearing housing 30 comprises an axially directed ring 44 with a radially (towards the axis A-A) directed annular protrusion 46, and an inner and outer cover 48, 50 in the form of an annular plate, respectively, together with the axle 42 defining a space 51 for a toroidal bearing 52*a* and an oscillating bearing 52*b*, to be arranged on the peripheral axial surface 42*a* (see FIG. 4C) of the axles 42, respectively, for avoiding constrainment and to take up any misalignments. The space 51 is filled with lubrication oil through the opening 35, which is closed by the screw 34. As already described above, the housing 30 is also provided with a threaded opening 36 for receiving the screw 38 (see FIG. 1B).

The plate 50 is coaxially provided with an opening covered with a sealing ring 53 provided with a central coaxial opening 54 for allowing access to a central, coaxial through-hole 56 through the anvil 18 along the axis A-A, i.e., the drum 19 and the two axles 42. The purpose of the through-hole 56 is to allow lifting of the anvil for maintenance thereof.

The anvil 18, i.e., the anvil drum 19 or the axles 42, is furthermore provided with an integral reference portion 60 provided with a radial surface 61 and an axial annular reference surface 62 concentric with the axis A-A.

The portion 60 is furthermore arranged with axially directed threaded openings 64 for receiving a screw 66 (see FIGS. 5A-5B), respectively.

Figure 4C:
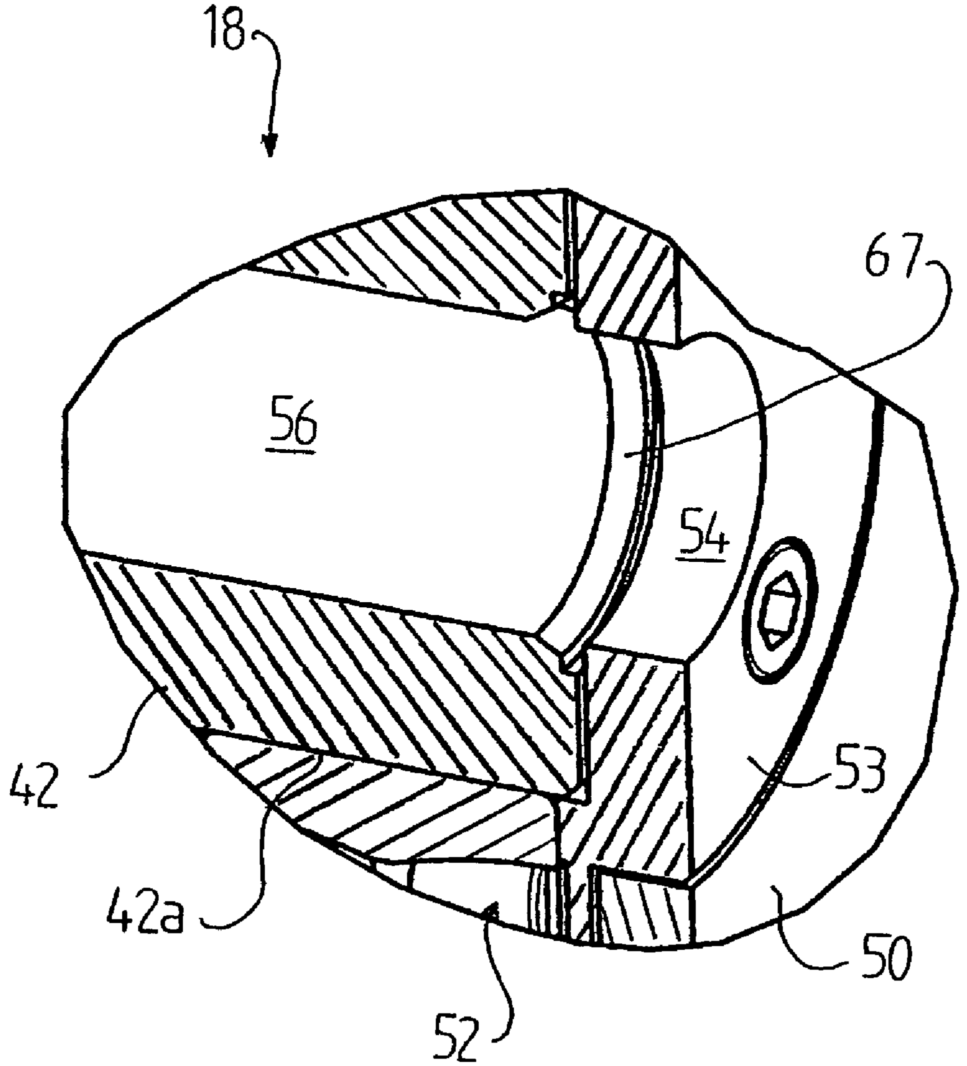
FIG. 4C is a magnification in-part of FIG. 4A.

In FIG. 4C is shown at the end of the axle 42 provided with an interior chamfer 67, constituting a reference surface for allowing centering of the anvil 18.

During manufacture of the anvil, the chamfer surface 67 is made first, then the anvil surface 43, the outer axial surface 42*a* of the axle 42 and the reference surface 62. Hereby, all of the surfaces are coaxial with the axis A-A. The bearings 52*a*, 52*b* can now be coaxially mounted on the axle 42.

Figure 5A:
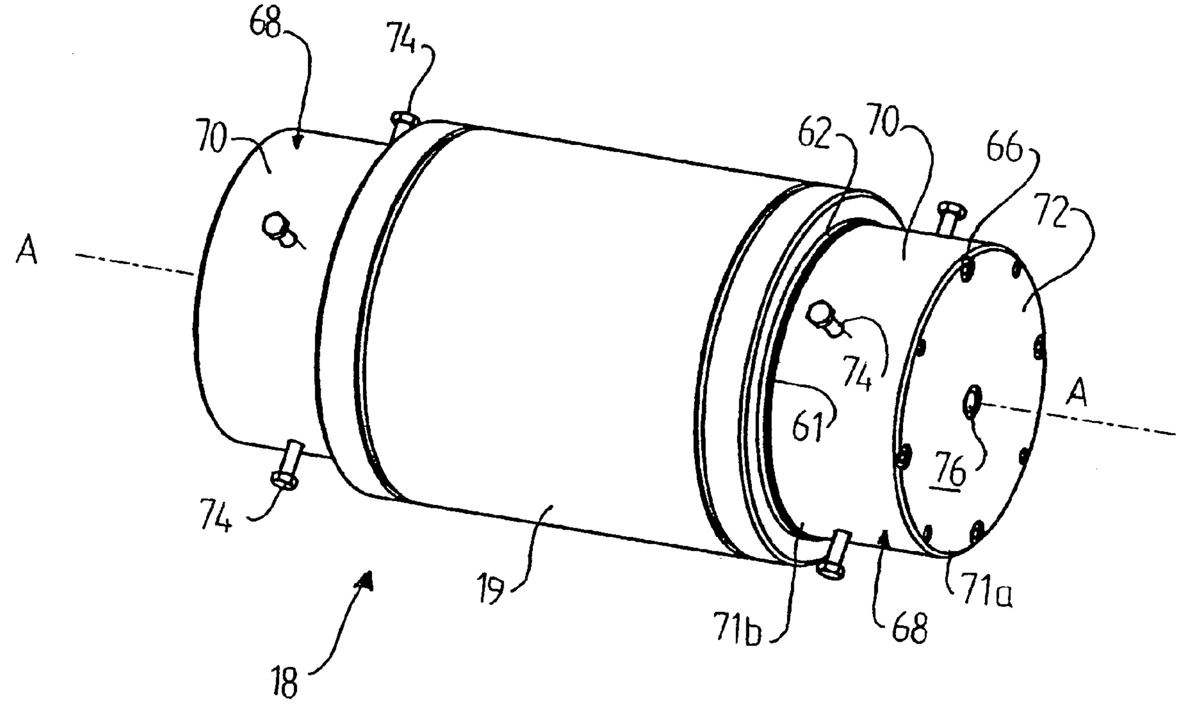
FIG. 5A illustrates the anvil shown in FIG. 4A provided with end caps.
Figure 5B:
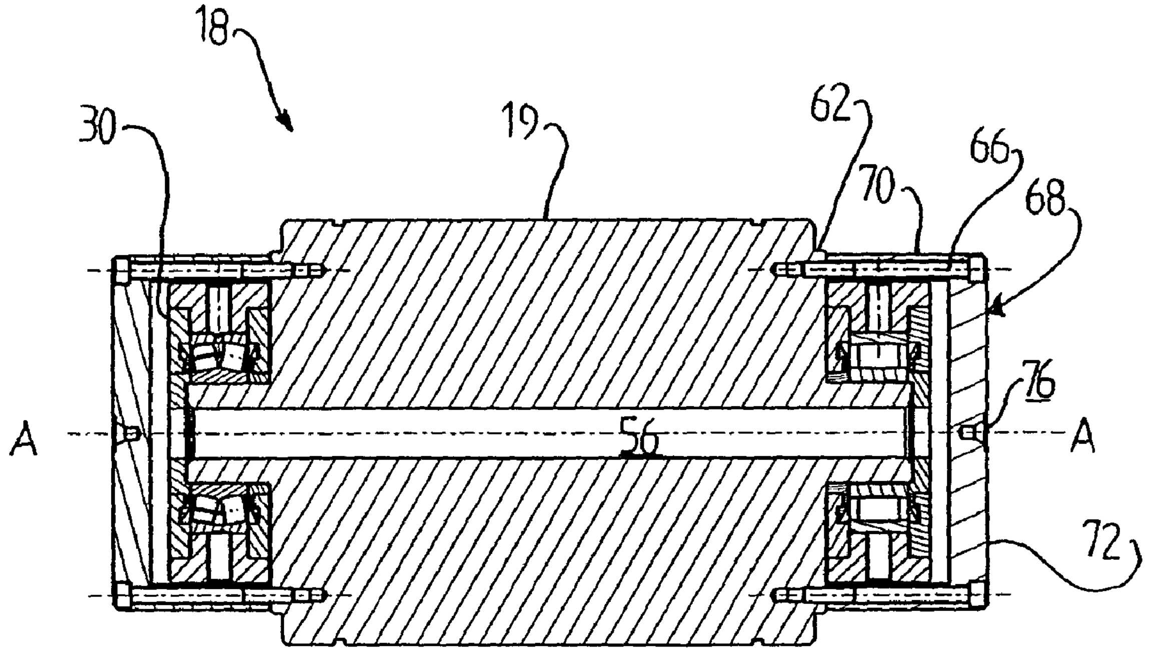
FIG. 5B is a cross-section of the anvil with end caps shown in FIG. 5A.

For regrinding purposes, the anvil 18 as shown in FIGS. 5A-5B, includes a cover member 68 in the form of a circular cylindrical mantle 70 and a lid 72, preferably being an integral part of the mantle 70. The cover member 68 is arranged outside and concentric with the bearing housing on each side of the anvil drum 19, such that it abuts the radial surface 61 of the reference portion 60, leaving the annular reference surface 62 accessible.

As already stated above, each axially directed threaded opening 64 is adapted to receive a screw 66 for connecting the cover member 68 to each axial side of the anvil drum 19, i.e., to cover the bearings 52*a*, 52*b* during grinding for protecting them during machining of the anvil surface 43.

The lid 72 is provided with a blind hole 76 to be utilised during grinding as a centering point of the anvil in relation to the axis of the re-grinding machine. It also serves to support the anvil during the re-grinding operation.

The centering screws 74 ensure that the blind hole 76 is aligned with the chamfer 67, i.e., that the cover member 68 is concentric with the axis A-A.

The surface 62 is thus used for centering the blind hole 76, such that it is centered in relation to the axis A-A. This is important for positioning the anvil 18 correctly in the re-grinding machine.

The cover protects the bearings 52 from the cooling liquid during machining, and thus allows the bearings to remain on the axle 42, in turn avoiding the risk for damaging the bearings during disassembly thereof, since they can remain on the axle 42, in turn saving time during the maintenance of the anvil 18.

Figure 6:
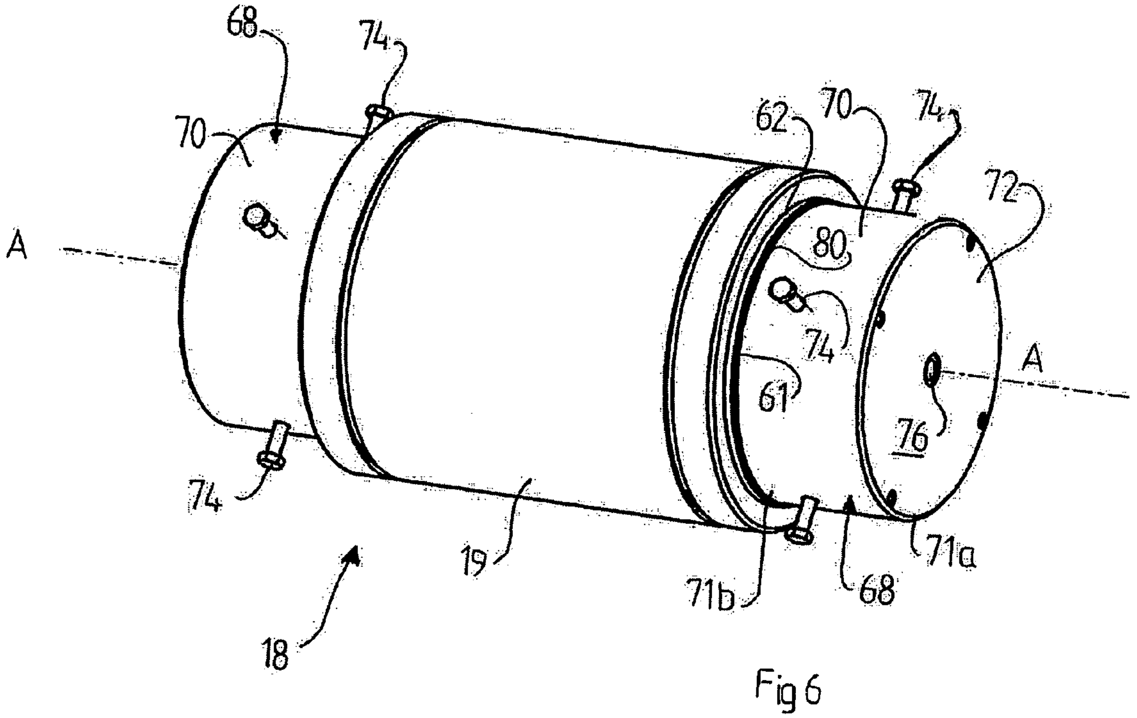
FIG. 6 is a variant of the anvil and end caps shown in FIG. 5A.

FIG. 6 shows a variant, according to which the centering screws 74 not only centers the cover member 68, but also connect the cover member 68 to the axial ends of the anvil drums for covering the axles 42. This is performed by tightening the screws 74 towards the bearing housing 30, or by providing the bearing housing with threaded openings for the centering screws 74. In addition, or alternatively, the cover member may be made of a magnetic material.

In order to seal the second end 71*b* of the cover member, it is provided with a sealing ring 61.

Figure 7:
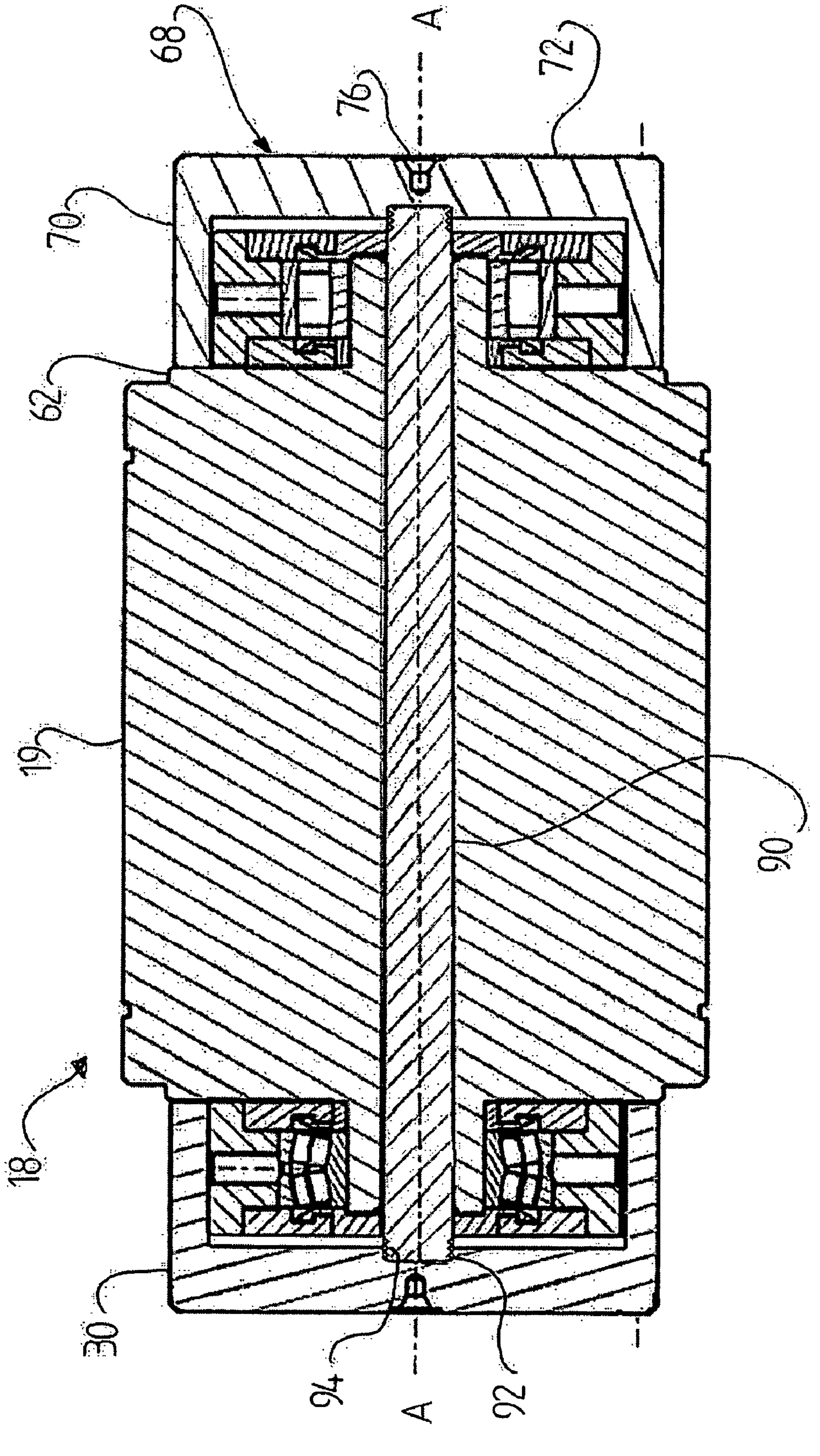
FIG. 7 is a further variant of the anvil and end caps shown in FIG. 5A.

FIG. 7 illustrates a further variant according to which a circular-cylindrical shaft 90 is pushed into the opening 56. The shaft is provided with a male thread 92 at both ends for receiving a female thread 94 in the inside of the lid 72 of each cover member 68, for connecting and centering the cover member to the axis A-A.

Alternatively, the shaft 90 is pointed in both ends, and conical openings are provided in the inside of the lid for guiding the pointed shaft, while tightening screws 66 according to FIG. 5B.

It should be noted that the sealing member shown in FIG. 6 may be utilized in any one of the described embodiments.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A rotary cutting apparatus, comprising:

a cutter drum having at least one cutting member;

an anvil drum having a rotary axis and arranged in a cutting relationship to said cutter drum, wherein a bearing housing is arranged on each axial side of the anvil drum;

a pressure actuating means for subjecting pressure on said cutting member in relation to said anvil drum, said pressure actuating means arranged to cooperate with a pair of levers, said pair of levers being rotatable about a pair of hinges having a horizontal axis and connected to said pair of hinges at a respective proximal end of said levers, said horizontal axis being parallel to but non-concentric with said rotary axis, said pressure actuating means disposed adjacent to distal ends of said pair of levers and causing said levers to rotate about said hinges at their ends in an arc-shaped movement;

a frame for supporting the cutter drum and the anvil drum in a rotatable relationship, wherein said pair of levers are releasably connected to the bearing housing and rotatable about said pair of hinges in such a way that the anvil drum is allowed to be removed from the frame; and at least one spring means arranged to act on said distal ends of the levers, said spring means positioned opposite to said actuating means for applying a counterbalancing linear force; wherein said horizontal axis of said levers is arranged vertically above said rotary axis and wherein said pressure actuating means actuates on said levers on the same side of a vertical plane through the horizontal axis as the rotary axis.

2. The rotary cutting apparatus according to claim 1, wherein said horizontal axis of said levers is arranged vertically below said rotary axis.

3. The rotary cutting apparatus according to claim 1, wherein said horizontal axis of said levers is arranged at about the same level as said rotary axis.

4. The rotary cutting apparatus according to claim 1, wherein said pressure actuating means comprises at least one pneumatic cylinder.

5. The rotary cutting apparatus according to claim 1, wherein at least one spring means is provided to counter balance the weight of the anvil.

6. The rotary cutting apparatus according to claim 1, wherein a lid is rotatably arranged at said frame, said levers being releasably connected to said lid.

7. The rotary cutting apparatus according to claim 1, wherein said pair of levers are arranged on a radial exterior side of said bearing housing, respectively.

8. The rotary cutting apparatus according to claim 7, wherein the levers are connected to the bearing housing, respectively, by means of at least one axial screw, nut or bolt.

9. The rotary cutting apparatus according to claim 2, wherein said pressure actuating means comprises at least one pneumatic cylinder and at least one spring means arranged to act on the levers at a position to the opposite to the hinge means, for allowing a predetermined force to be applied by the cylinder.

10. The rotary cutting apparatus according to claim 2, wherein said pressure actuating means actuates on said levers on the same side of a vertical plane through the horizontal axis as the rotary axis.

11. The rotary cutting apparatus according to claim 2, wherein at least one spring means is provided to counter balance the weight of the anvil.

12. The rotary cutting apparatus according to claim 2, wherein said pair of levers are arranged on a radial exterior side of said bearing housing, respectively.

13. The rotary cutting apparatus according to claim 12, wherein the levers are connected to the bearing housing, respectively, by means of at least one axial screw, nut or bolt.

14. The rotary cutting apparatus according to claim 3, wherein said pressure actuating means comprises at least one pneumatic cylinder and at least one spring means arranged to act on the levers at a position to the opposite to the hinge means, for allowing a predetermined force to be applied by the cylinder.

15. The rotary cutting apparatus according to claim 3, wherein said pressure actuating means actuates on said levers on the same side of a vertical plane through the horizontal axis as the rotary axis.

16. The rotary cutting apparatus according to claim 3, wherein at least one spring means is provided to counter balance the weight of the anvil.

17. The rotary cutting apparatus according to claim 3, wherein said pair of levers are arranged on one axial side only of said bearing housing.

18. The rotary cutting apparatus according to claim 17, wherein the levers are connected to the bearing housing, respectively, by means of at least one radial screw, nut or bolt.

* * * * *